United States Patent [19]
Eisele et al.

[11] Patent Number: 5,299,725
[45] Date of Patent: Apr. 5, 1994

[54] DESOLDERING TOOL

[75] Inventors: Ernst Eisele, Walheim; Fritz Eisele, Hessigheim, both of Fed. Rep. of Germany

[73] Assignee: Cooper Industries, Inc., Houston, Tex.

[21] Appl. No.: 674,374
[22] PCT Filed: Oct. 20, 1989
[86] PCT No.: PCT/EP89/01260
 § 371 Date: Apr. 11, 1991
 § 102(e) Date: Apr. 11, 1991
[87] PCT Pub. No.: WO90/04481
 PCT Pub. Date: May 3, 1990

[30] Foreign Application Priority Data

Oct. 21, 1988 [DE] Fed. Rep. of Germany ... 8813263[U]

[51] Int. Cl.$^5$ .................................................. B23K 1/00
[52] U.S. Cl. .................................. 228/20.1; 228/20.5
[58] Field of Search ................. 228/20 R, 20 HT; 219/230

[56] References Cited

U.S. PATENT DOCUMENTS

| | | | |
|---|---|---|---|
| 2,955,187 | 10/1960 | Campo | 228/20 HT |
| 3,211,354 | 10/1965 | Dugard et al. | 228/20 HT |
| 3,245,598 | 4/1966 | Kopernak | 228/20 HT |
| 3,259,293 | 7/1966 | Dezzani | 228/20 |
| 3,561,662 | 2/1971 | Duhaime | 228/20 HT |
| 3,970,234 | 7/1976 | Litt et al. | 228/20 |
| 4,206,864 | 6/1980 | Rauchwerger | 228/20 HT |
| 4,289,953 | 9/1981 | Scheu, Jr. | 228/20 HT |
| 4,435,636 | 3/1984 | Royston | 219/230 |
| 5,007,574 | 4/1991 | Carlomagno et al. | 228/20 HT |

FOREIGN PATENT DOCUMENTS

1914909 4/1965 Fed. Rep. of Germany ...... 5/B23K

*Primary Examiner*—Mark Rosenbaum
*Assistant Examiner*—Chuck Y. Mah
*Attorney, Agent, or Firm*—David A. Rose

[57] ABSTRACT

A desoldering tool for melting and collecting solder includes a heated desoldering tip connected to a suction tube. The tip and tube from a flow bore for the flow of melted solder. The suction tube projects into an elongated tin collecting container which in turn is connected to a vacuum tube connected to a vacuum source. The axis of the suction tube traverses the axis of the container such that the solder flowing rom the suction tube is directed toward the interior wall of the container. That portion of the suction tube extending into the container forms a tin collecting space therearound for collecting the melted tin flowing from the mouth of the suction tube.

14 Claims, 3 Drawing Sheets

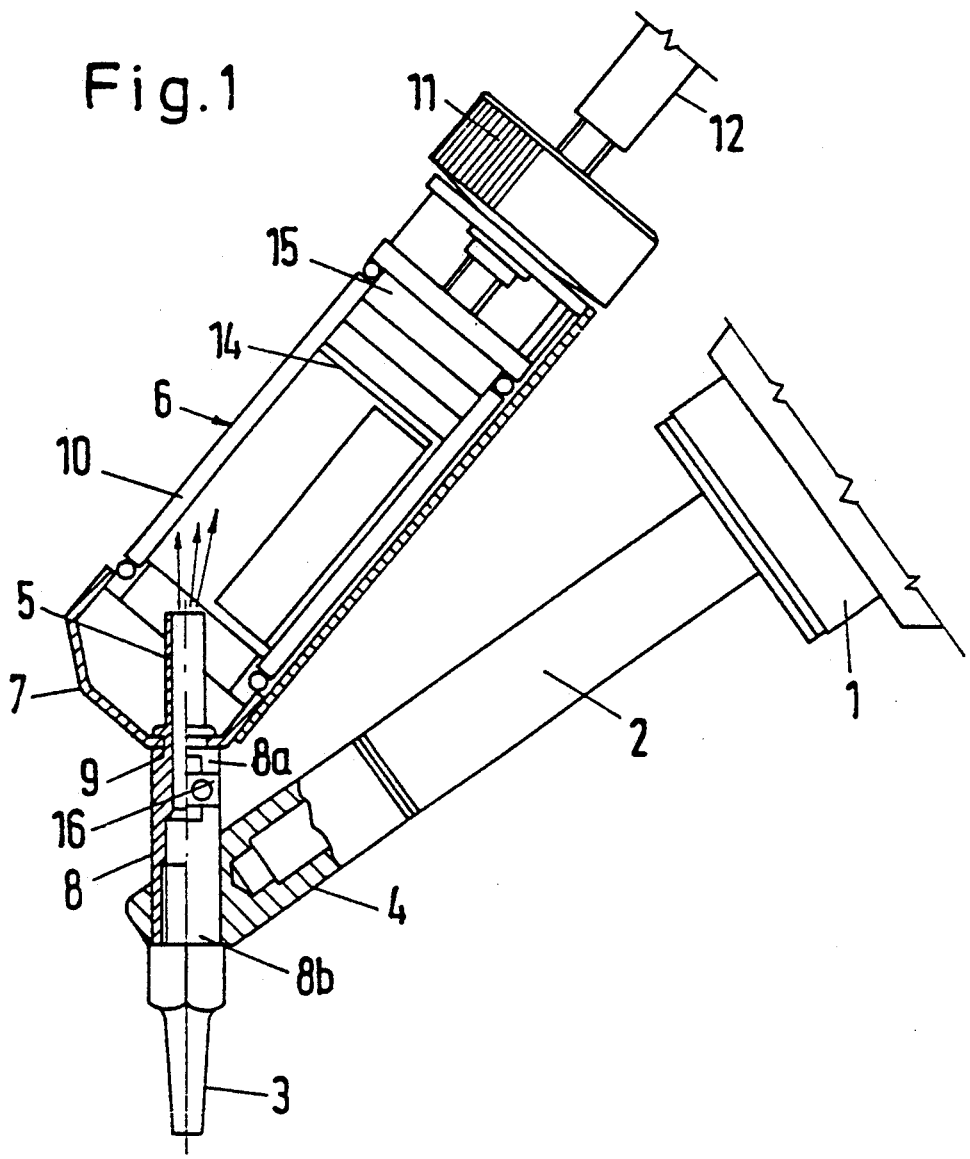

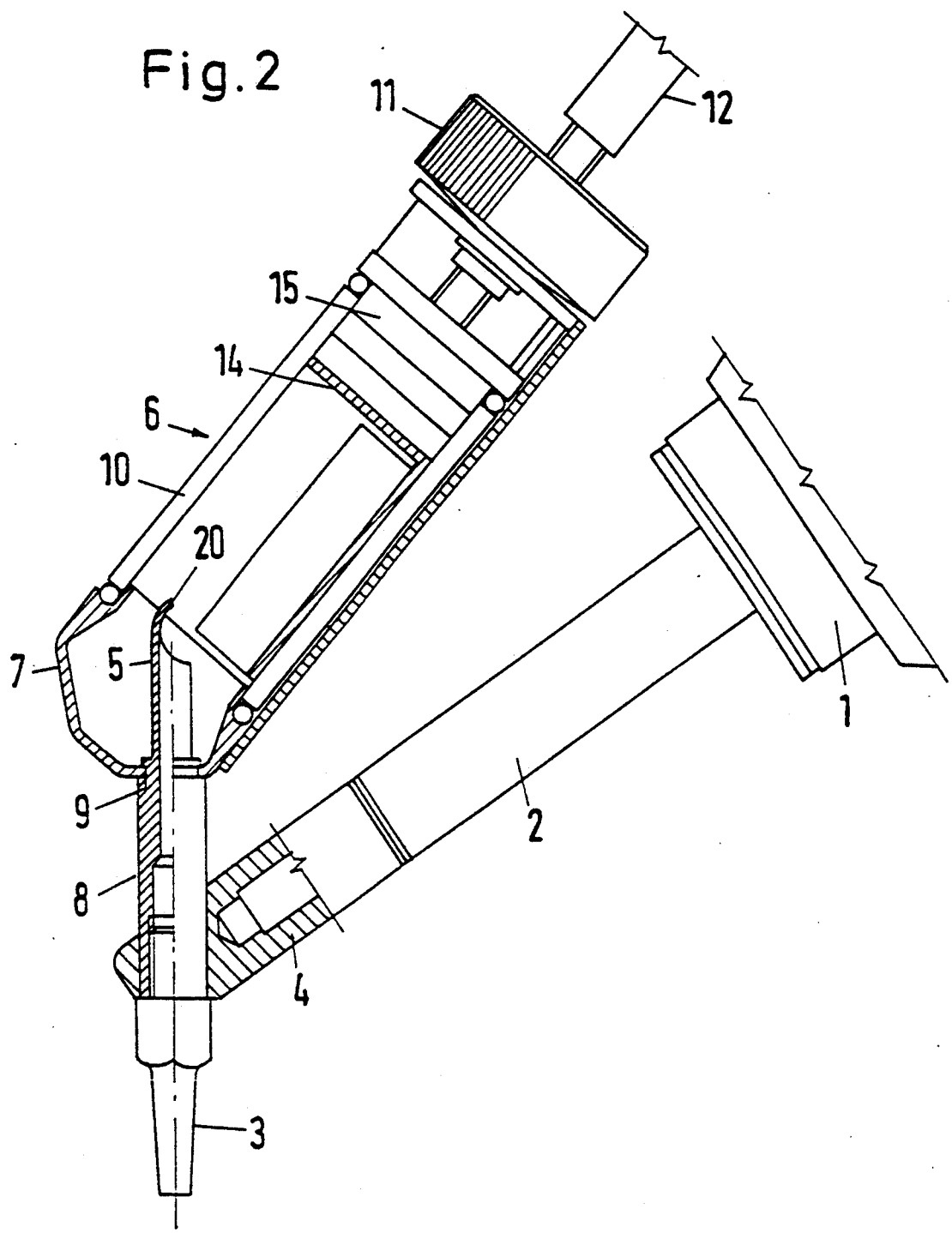

DESOLDERING TOOL

BACKGROUND OF THE INVENTION

The invention relates to a desoldering tool of the type comprising a heated desoldering tip of which the bore is connected via a suction tube to the front end of an elongated tin collecting container with the rear end being connected via a vacuum tube to a vacuum source.

In such desoldering tools the solder caused to melt with the aid of the desoldering tip is sucked off through the bore of the desoldering tip and a suction tube which opens into the front end of an elongated tin collecting container of which the other end is connected to a vacuum source in order to suck the molten solder through the desoldering tip and the suction tube into the tin collecting container, in the path of which a baffle plate is usually arranged against which the extracted tin strikes, an air permeable filter being arranged behind the baffle plate. In such desoldering tools the tin collects in the tin collecting container and there is a danger that the tin in the tin collecting container, due to the thermally conductive connection to the suction tube and the desoldering tip and the vicinity to the heating element of the desoldering tool, will be held partially in molten state and drip back through the suction tube and interrupt the vacuum. To avoid this dripping back, it is known to make the suction tube bent and allow it to open into the front end face of the tin collecting container. However, such a bent suction tube easily becomes clogged and is difficult to clean.

SUMMARY OF THE INVENTION

From the U.S. Pat. No. 3 970 234, a desoldering tool is known wherein the straight suction tube extends through a mounting member to the rear end of which a glass cylinder having an end cap is secured, said glass cylinder forming the tin collecting container. Between the mounting member and the inner space of the glass cylinder, an air permeable filter is arranged, the suction tube also extending through said filter. Within the head piece and around the suction tube, a plenum is formed which is connected to a vacuum source. The air from the tin collecting container formed within the glass cylinder is therefore sucked of via the filter into the plenum and then to the vacuum source. The suction tube extends beyond the filter such that a kind of tin collecting space is thereby formed around the portion of the suction tube protruding beyond the filter, but tin dripping back and collecting in this tin collecting space would block the filter so that the desoldering tool could not be operable anymore.

The invention is based on the problem of providing a desoldering soldering tool of the type mentioned above in which the dripping back of the extracted tin is avoided without having to use a bent tube that is difficult to clean. This problem is solved by characterized in that the front end of the tin collecting container is made conical, that the suction tube extends through a bore formed in the generated surface of the conical end of the tin collecting container into the latter and projects with respect to the inner wall of the generated surface via a considerable distance such that a tin collecting space is formed around the portion of the suction tube projecting into the interior of the conical end.

Advantageous embodiments and further developments of the invention will be apparent from the subsidiary claims.

With the configuration of the desoldering tool according to the invention it is ensured that even when using a straight suction tube, dripping back of the extracted tin is avoided with certainty because the tin collects around the portion of the suction tube projecting into the interior of the conical end and thus lies beneath the mouth of the suction tube in the tin collecting container.

According to a further development, the conical end of the tin collecting container may be formed by a frustoconical end cap which is connected to a cylindrical portion of the elongated tin collecting container. The suction tube extends at a right-angle to a generatrix of the conical generated surface or shell in the direction towards the axis of the cone.

According to one embodiment the cone angle is chosen such that the tin emerging from the inwardly disposed end of the suction tube meets the inner wall of the cylindrical portion at an inclined angle such that the tin does not adhere to said cylindrical portion, which is preferably formed by a glass tube.

According to another embodiment of the invention, the inwardly disposed end of the suction tube arranged in the tin collecting container is bent in the direction towards the axis of the tin collecting container so that the extracted soldering tin is deflected to a greater or lesser degree rearwardly into the cylindrical portion of the tin collecting container. The extent of this deflection of the molten tin or solder depends on the extent of the bending. This likewise avoids the soldering tin being able to build up on the glass wall in a straight line to the suction tube and possibly after a period of time blocking the inwardly disposed end of the suction tube.

According to an advantageous further development of the invention, the suction tube is further formed by two portions which are connected together by a connecting piece of thermally insulating material. This reduces the thermal conduction from the desoldering tip to the solder collecting container so that at the most the portion of the extracted tin lying lowermost in the conical end of the solder collecting container is held in a liquid state while the higher portion of the extracted tin material is always solidified and thus cannot enter into the mouth of the suction tube.

BRIEF DESCRIPTION OF THE DRAWINGS

Examples of embodiments of the invention will be explained in detail hereinafter with the aid of the drawings, wherein:

FIG. 1 shows a first embodiment of the desoldering tool,

FIG. 2 shows a second embodiment of the desoldering tool,

DESCRIPTION OF THE PREFERRED EMBODIMENTS

Figure 3A:
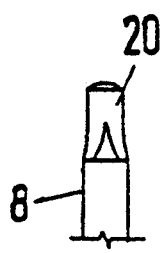
FIG. 3a-d show a first embodiment of the inwardly disposed end of the suction tube.
Figure 3B:
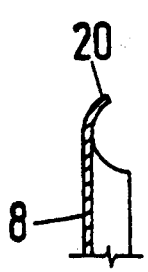
Figure 3C:
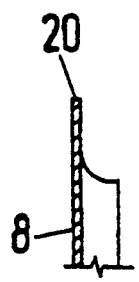

The embodiments of the desoldering tool illustrated in FIGS. 1 and 2 have an only partially illustrated grip 1 of conventional type which is connected to the outer jacket of a heating element 2 into the free end 4 of which a desoldering tip 3 can be screwed. The desoldering tip 3 comprises a center bore which is not illustrated and which opens into a suction tube 8 which is connected to the front end of the heating element 4. The suction tube 8 opens into the front end of a soldering tin collecting container which is denoted as a whole by 6 and the rear end of which is connected via a closure cap 11 to a vacuum tube 12 which leads to a vacuum source, not illustrated.

The front end 7 of the tin collecting container 6 is formed by a frustoconical end cap which in its generated surface, comprises along a generatrix, a bore 9 through which the suction tube 8 projects into the interior of the tin collecting container 6, a projecting portion 5 lying in the interior of the tin collecting container 6. As can be seen from the drawings, this results in the formation around the periphery of the projecting portion 5 of the suction tube 8 of a tin collecting space which must first be filled to enable the extracted tin collected in this tin collecting space, to reenter the suction tube via the mouth of the projecting portion 5 and drip back.

As can be seen from the drawings, the axis of the suction tube 8 extends at a right-angle to a generatrix of the conical generated surface of the frustoconical end cap in the direction towards the cone axis so that the generatrix extends approximately horizontally in the operating position of the desoldering tool.

In the embodiment according to FIG. 1, molten tin emerging from the mouth of the projecting inwardly disposed portion 5 of the suction tube 8 strikes the portion 10 of the tin collecting container 6 adjoining the end cap 7 at such an inclined angle that said tin cannot adhere to the inner surface of said cylindrical portion. This can be achieved by appropriate choice of the cone angle.

In the embodiment according to FIG. 2, in contrast the inwardly disposed free end of the suction tube 8 is bent in the direction towards the axis of the cylindrical portion 10 of the solder collecting container so that the extracted soldering tin is deflected to a greater or lesser degree rearwardly, the extent of said deflection depending on the bend as will be explained in more detail with reference to FIGS. 3a–d and 4a–d.

Also arranged in the interior of the soldering collecting container 6 is an only schematically illustrated, baffle metal plate 14 which is followed by a filter 15 which separates the air also extracted via the suction tube 8 from solid constituents.

As illustrated schematically in FIG. 1 in the right half of the suction tube 8, the latter may also be formed by two suction tube portions 8a, 8b, which are connected together by a connecting piece 16 of thermally insulating material. This division of the suction tube is not illustrated in FIG. 2.

Figure 3D:

FIG. 3a–d shows a first embodiment of the inwardly disposed bent end of the suction tube according to FIG. 2 in more detail. In FIG. 3d, a plan view of the free end of the suction tube before the bend thereof is illustrated. As apparent from this Figure, the free inwardly disposed end of the suction tube is bevelled almost down to the wall thickness of the suction tube and the remaining portion 20 of the jacket of the suction tube 8 is bent towards the axis of said tube as particularly apparent from FIG. 3b. FIG. 3a shows a view of the suction tube according to FIG. 3b turned through 90°.

Figure 4A:
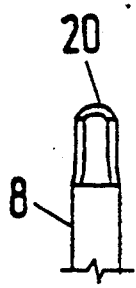
FIG. 4a-d show a second embodiment of the inwardly disposed end of the suction tube.
Figure 4B:
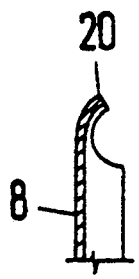
Figure 4C:
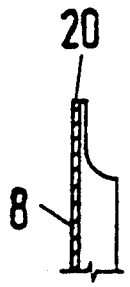
Figure 4D:

In the embodiment of the suction tube according to FIG. 4a–d, the bevelling does not occur down to the wall thickness of the suction tube so that a portion of the outer surface according to FIGS. 4c and 4d remains. In this manner a somewhat spoon-shaped end of the suction tube occurs, as can be seen from FIGS. 4a and 4b.

As already mentioned, the portion remaining in the bevelling may be bent to varying extents, i.e. up to the axis of the suction tube or beyond said axis, the extent of the bending governing the deflection angle of the extracted soldering tin.

What is claimed is:

1. Desoldering tool for melting and collecting solder comprising:
   a heated desoldering tip;
   a suction tube connected to said tip; said tip and tube forming a bore having a flow axis for the flow of solder;
   an elongated tin collecting container having an interior wall and a front end and a rear end forming a central axis;
   a vacuum tube connected to a vacuum source and to said rear end of said container;
   said suction tube having a portion thereof projecting into said front end of said tin collecting container;
   said flow axis of said suction tube traversing said central axis of said container causing the solder flowing from said suction tube to be directed towards said interior wall; and
   a tin collecting space being formed around said projecting portion of said suction tube projecting into said container.

2. Desoldering tool according to claim 1, characterized in that said front end of the tin collecting container (6) is formed by a frusto-conical end cap.

3. Desoldering tool according to claim 1, characterized in that said front end is conical and that said suction tube extends through a bore formed in the generated surface of said conical front end, said flow axis extending at a right angle to a generatrix of the generated surface of the conical end in the direction towards the cone axis.

4. Desoldering tool according to claim 3 characterized in that the generated surface of said conical front end of said tin collecting container forms a cone angle with said central axis such that molten tin emerging from said suction tube (8) impacts said interior wall at an inclined angle.

5. Desoldering tool according to any one of claims 1, 2, or 4 wherein said suction tube is formed by two suction tube portions which are connected together by a thermally insulating material.

6. Desoldering tool according to claim 5, wherein said projecting suction tube portion is bent in a direction toward said central axis of said tin collecting container so that the molten tin emerging from said suction tube is deflected rearwardly by said projecting portion into the tin collecting container.

7. Desoldering tool according to claim 6, wherein said projecting end of the cylindrical suction tube has a bevelled outlet end, and said bevelled outlet end being bent in the direction towards said flow axis of the suction tube.

8. Desoldering tool according to claim 7, characterized in that said bevelled outlet end is arcuate and includes a tip which extends up to the flow axis of the suction tube.

9. Desoldering tool according to claim 6, wherein said bevelled outlet end has a thickness less than or equal the thickness of the suction tube wall.

10. Desoldering tube according to claim 6, wherein said bevelled outlet end has a convex face.

11. A desoldering tool according to claim 1 wherein said tin collecting container further includes a baffle metal piece followed by a filter disposed between said projecting portion of said suction tube and said rear end of said tin collecting container.

12. A desoldering tool according to claim 1 wherein said suction tube includes a thermally insulated portion between said projecting portion and said desoldering tip whereby the thermal conduction from said soldering tip to said tin collecting container is reduced.

13. A desoldering tool according to claim 1 wherein said projecting portion of said suction tube projects into said tin collecting container a sufficient distance such that the tin collects in said tin collecting space with that portion of the tin adjacent the bottom of said front end being in the liquid state and the tin most adjacent the outlet end of said projecting portion being in the solidified state.

14. A desoldering tool, comprising:

a heatable desoldering tip including a coaxial central bore;

a suction tube having first and second tube ends, said first tube end connected to said tip and in communication with said bore;

an elongated tin collecting container having coaxial, substantially separated front and rear container ends, said rear container end being connected via a vacuum tube to a vacuum source, said front container end comprising a frustoconical wall defining a cone angle and having a bore therethrough, said bore being adapted for receiving said second tube end at an angle substantially perpendicular to said conical wall;

said second tube end projecting through said bore and extending into said tin collecting container;

whereby said tin collecting container is inclined with respect to said suction tube and a tin collecting volume is formed between said projecting second tube end and said front container end.

* * * * *